Sept. 29, 1970      G. H. THOMEN      3,530,661

METHOD FOR PRESTRESSING ARMORED CABLE

Filed March 21, 1969      2 Sheets-Sheet 1

George H. Thomen
INVENTOR

BY William J. Beard

ATTORNEY

Sept. 29, 1970  G. H. THOMEN  3,530,661
METHOD FOR PRESTRESSING ARMORED CABLE
Filed March 21, 1969  2 Sheets-Sheet 2

George H. Thomen
INVENTOR

BY William J. Beard

ATTORNEY

United States Patent Office 3,530,661
Patented Sept. 29, 1970

3,530,661
METHOD FOR PRESTRESSING ARMORED CABLE
George H. Thomen, Houston, Tex., assignor to Schlumberger Technology Corporation, New York, N.Y., a corporation of Texas
Filed Mar. 21, 1969, Ser. No. 809,314
Int. Cl. D02g 3/36; D07b 1/06
U.S. Cl. 57—162                                                7 Claims

ABSTRACT OF THE DISCLOSURE

The technical disclosure herein, which illustrates the principles of the present invention concerns methods for manufacturing well logging cable having conductors with thermoplastic insulation. With the objective of minimizing undesirable permanent stretch of the cable in use, the method steps include pre-stressing the cable before the first of two armor layers is applied, and then subjecting the cable to inward radial forces and heating calculated to deform the conductor insulators and to fill any interior interstices present in the cable construction. While the insulators are in their deformed state the cable is cooled to alter the shape memory of the thermoplastic insulator material. Finally, the outer layer of armor is applied to complete the cable construction.

BACKGROUND OF THE INVENTION

This invention relates generally to the manufacture of cable and more specifically to the manufacture of high quality armored well logging cable which is prestressed to minimize permanent stretch.

Armored cables used in well logging generally serve a dual purpose. First, the cable provides electrical communication with the well logging tool. Secondly, the cable provides a means of continuously measuring the depth of the well logging tool while the tool is being raised and lowered in the borehole.

It will be appreciated that under normal use a logging cable will expand and contract due to the high temperature and to pressure forces present in the well bore and acting on the cable. However, such thermal expansion and contraction of the cable may be taken into account in depth calibration techniques based on known properties of the cable materials. For the cable to be useful in measuring the depth of the logging tool, however, the so-called "permanent stretch" of the cable must be kept at a minimum since this type of stretch is not highly predictable in nature. The permanent stretch of a cable may be defined as that change in length of the cable measured at a reference temperature and tension, after the cable has been subjected to a heat and tension cycle, such as would be encountered in a well bore. This stretch may generally be attributed to imperfections in the cable's construction. The imperfections cause spaces or interstices to be present in the cable's interior. When the cable is placed under tension, the interstices provide room for expansion and deformation of the cable materials, thereby allowing permanent stretch to take place.

It has long been recognized that permanent stretch in a well logging cable is an undesirable feature. To solve this problem, prior art methods of manufacturing prestressed logging cables have been used but with varying degrees of success. Permanent stretch caused by torsional unbalance of the cable has, for example, been compensated for by the method of prestressing disclosed in U.S. Pat. No. 3,137,988 which is assigned to the assignee of the present invention. Hot prestressing of cable using rubber insulation material is disclosed in U.S. Pat. 3,153,-696 which is also assigned to the assignee of the present invention.

However, due to the requirements of more modern and sophisticated electronic circuitry now in use in well logging services, increased requirements have been placed upon the electrical characteristics of the cable. For this reason, the prior art cables which utilize rubber insulated electrical conductors have been to a large extent replaced with logging cables utilizing conductors insulated with thermoplastic material such as ethylene propylene or the like. While thermoplastic insulating materials have improved the electrical characteristics of the cable, unfortunately such materials have a property which can be called a "memory" with respect to shape. That is to say, even after such materials have been heated and deformed, they still possess a degree of resiliency and will tend to regain their original shape. On the other hand, the prior art insulating materials, such as rubber, did not have shape memory and could be prestressed by simultaneously heating and applying tension, as disclosed in the above-mentioned patent, without encountering the difficulties of having the materials later tend to return to their original shape.

In a copending patent application entitled "Method and Apparatus for Pre-Stressing Armored Cable," Ser. No. 809,357, filed and assigned to the assignee to the present invention, there is disclosed a new and improved method and apparatus for producing prestressed well logging cables utilizing conductor insulation material of the thermoplastic type. According to that disclosure, the cable is prestressed after the cable construction is completed, i.e., after all the armor layers have been placed about the cable exterior. According to the present invention, however, the prestressing step is carried out during the manufacturing process. As will subsequently become more apparent, the method of the present invention can be practiced without applying large longitudinal tensions in the cable. Therefore, the danger of cable damage due to excessive tension applied in the prestressing process is minimized.

Accordingly, it is an object of the present invention to provide a new and improved method for manufacturing a prestressed well logging cable having conductor insulator materials with a plastic shape memory, the method including steps calculated to alter the memory of the materials prior to completion of the cable.

A further object of the present invention is to provide an improved method for prestressing cable continuously during its manufacture and prior to its completion by utilizing a heating and cooling cycle designed to alter the plastic memory of the insulator materials surrounding the cable conductors.

Yet another object of the present invention is to provide a novel method for stabilizing the length of an electrical well logging cable during its manufacture without placing the cable under high longitudinal tension during the manufacture process.

These and other objects are attained in accordance with the principles of the present invention by a method for manufacturing prestressed cables having conductors insulated with thermoplastic materials in such a manner as to prevent the occurrence of undesirable permanent stretch in the cable. The manipulative steps or the method include deforming the conductor insulation materials during manufacture after one layer of armor is wound about the core of the cable. Such deformation may be accomplished by heating the cable and simultaneously placing the cable under tension, or by passing the cable through rollers designed to press radially inward on the cable core. While the cable is in a heated state sufficient to make the insulation materials pliable (but not melted), such materials may be readily deformed by inward radial forces, and then cooled while still in such deformed state. The heating and cooling cycle is calculated to alter the shape memory of the conductor insulators. The deformation will occur in such a manner that the insulation materials will be deformed to fill all the interstices existing within the cable, so as to permanently compact the central cable core.

The novel features of the present invention are set forth with particularity in the appended claims. The operation, together with further objects and advantages of the invention, may be best understood by way of illustration and example of certain embodiments when taken into conjunction with the accompanying drawings.

DESCRIPTION OF THE PREFERRED EMBODIMENTS

Figure 1:
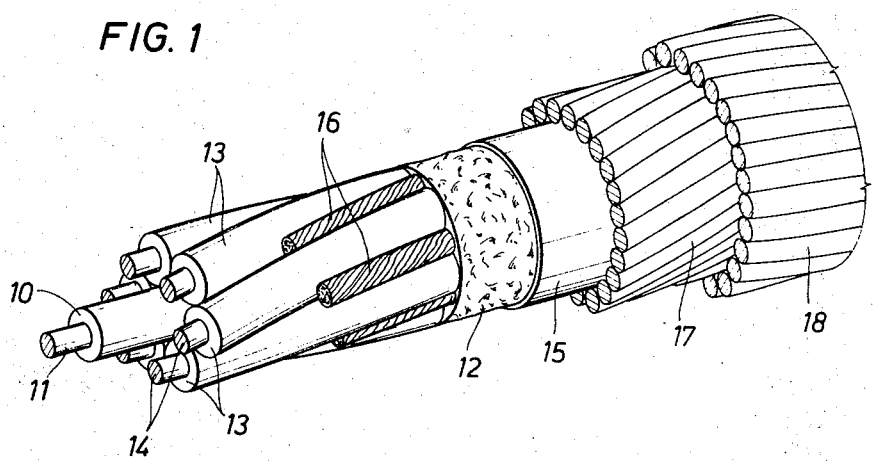
FIG. 1 is a sectional view of a well logging cable produced in accordance with the present invention.

Prior art well logging cables utilizing rubber insulation for the conductors could be prestressed by heating the cable to the point where the rubber was readily deformable and then placing the cable under tension. This would deform the rubber to fill the internal interstices, and since the rubber material did not have a shape "memory" it would retain the deformed shape when the tension was released. However, the thermoplastic insulation materials such as ethylene propylene or the like now in use on improved logging cables have a memory characteristic which, if the same prestressing technique is utilized, may cause such conductor insulation materials to tend to resume their circular cross-sectional shape upon release of tension from the cable.

In a typical well logging application, the cable passes through a heating and cooling cycle while under tension; that is, when the cable is lowered into the well, it is gradually heated under tension (due to the cable's own weight and the weight of the sonde) and when it is removed from the well, it is gradually cooled under tension. The tension forces on the cable can cause the outer armor layers to exert inward radial forces, which tend to deform the inner cable materials as the logging sonde is lowered into the well. However, as the sonde and cable are withdrawn from the well, the insulation materials are held in a deformed state while the cable is cooled. This cooling of the cable under tension can have the effect of altering the shape memory of the thermoplastic insulation materials and hence, such materials would retain their deformed state when the tension is removed. When this occurs in the borehole, an undesirable permanent stretch is introduced into the cable and consequently the cable is no longer properly calibrated with respect to length.

The recognition that this phenomenon occurs in the use of well logging cables has led to the development of methods and apparatus as disclosed in the previously mentioned copending application for the manufacture of prestressed cables. The methods and apparatus of the copending application are designed to duplicate in the manufacturing process the worst possible conditions to be encountered in a well bore and hence, to prestress cable so as to avoid any undesirable permanent stretch when the cable is later used in a logging operation. The present invention is directed toward attaining the same result as in the previously mentioned copending application. The present invention, however, includes steps carried out during the manufacturing process of the cable and prior to the installation of the outer armor layer. The method of the present invention has the advantage of enabling the deformation of the cable's central core structure to be accomplished without placing the cable under any significant amount of tension, and in fact, no more tension than is used to move the cable along the assembly line, and without requiring as much heating or cooling as in the method disclosed in the previously mentioned copending application.

Figure 2:
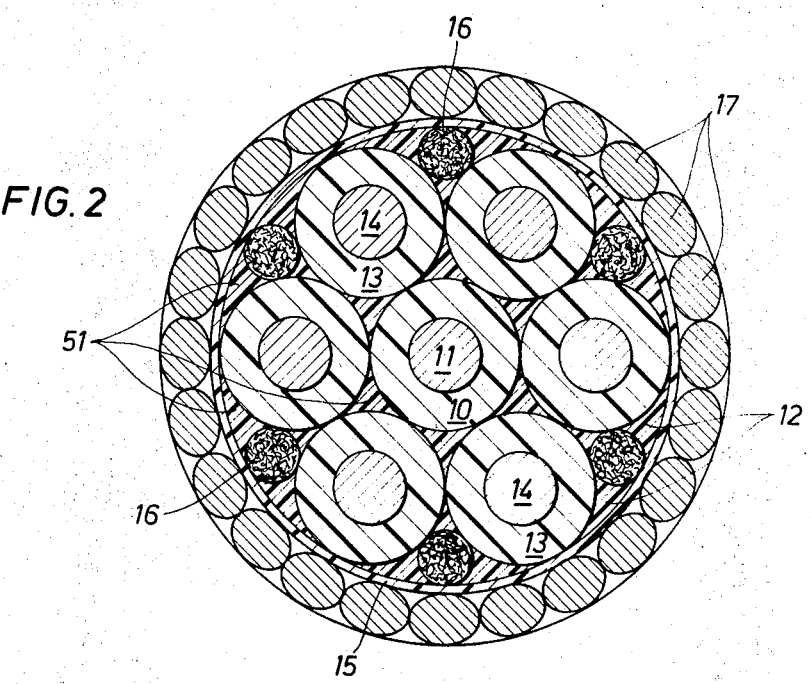
FIG. 2 is an enlarged cross-sectional view showing the construction of the cable of the present invention prior to the prestressing process.

Referring now to FIGS. 1 and 2, the overall construction of a seven conductor well logging cable in accordance with the principles of the present invention is shown. The center conductor 11 is surrounded by an extruded insulation layer 10 made of a thermoplastic material such as ethylene propylene or the like. Outer conductors 14 are of the same general construction as the center conductor and also have thermoplastic insulation layers 13. A filler layer 12 may be a cured solid material which is applied as the outer conductors are cabled about the inner conductor. This material may be in the form of a slurry which is applied as the conductors are cabled, and can be, for example, depolymerized rubber (DPR) which is self-curing and setting into a solid state. Cotton yarn 16 or the like may also be simultaneously wound around about the inner core to partially fill the external interstices 51 between the outer conductors 14. Overlying this subassembly is a layer 15 which may be of a Dacron tape material or the like wrapped about the inner core in order to facilitate handling during production.

The inner core construction of the cable is surrounded by two layers of armor wire 17 and 18. These armor wire layers are cable wound with opposite lays (i.e., one layer has a left hand lay, the other a right hand lay) and differing pitches in the manner disclosed in U.S. Pat. 3,137,988 in order to provide a torque balanced cable. The armor layers perform the load bearing function of the cable and, further, serve to protect the inner core.

Referring still to FIG. 2, a cross-sectional view of the cable of FIG. 1 (less the outer armor layer 18) is shown to illustrate the symmetrical distribution of the cable conductors prior to the performance of the prestressing method of the present invention. The insulated conductors in the cable core, being of a round cross section, provide gaps or interstices 51. When longitudinal tension is applied to the cable, the outer armor which is spiral wrapped, as indicated by the elliptical cross section of FIG. 2 tends to unwind, and hence, exerts inward radial forces upon the cable core. The radial forces cause the insulators of the conductors to deform and expand into the interstices of the cable. This effect may be further appreciated by reference to FIG. 3, which shows a cross section of the partially complete cable after the prestressing method of the present invention has been carried out. The prestressing is accomplished by the application of an inward radial force to compress and compact the inner cable construction while simultaneously applying heat to the inner cable structure to make the conductor insulation materials pliable, but not in a melted state. In accordance with the present invention, the inward radial force may be supplied in different manners, as will be more freely discussed herein.

The inward radial forces act to compress and compact the core, deforming the conductor insulators 10 and 13 so as to fill all remaining interstices 51. Even though filler material 12 is applied during the manufacturing process, this does not prevent the insulators from deforming and filling up the interstices, because the filler material does not completely fill all the interstices and moreover, the filler is compressible.

Figure 4A:
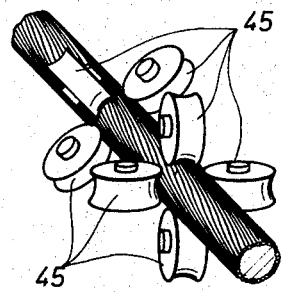
FIG. 4A is an enlarged schematic view showing the rollers of FIG. 4 in more detail.
Figure 4:
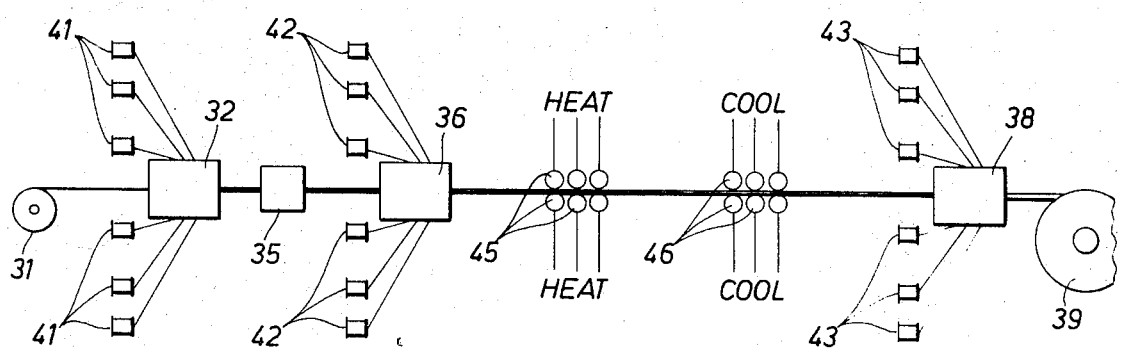
FIG. 4 is a schematic diagram showing a first embodiment of a production line for producing cable prestressed according to the method of the present invention.

Referring now to FIG. 4, a schematic representation of a production line for producing armored well logging cable in accordance with the present invention is shown. A single insulated center conductor 10 is fed from a supply spool 31 into the production line and through a cabling machine 32 which cable wraps the remaining insulated conductors 13 about the center conductor in the symmetric configuration shown in FIG. 2. Simultaneously, cabling machine 32 wraps cotton filler yarn 16 to partially fill the external interstices between the outer conductors. As the cable progresses through the cabling machine 32 the conductors pass through a slurry of filler material 12. The conductors 10 and 13 and cotton fillers 16 pick up some of this slurry on their external surfaces so that it becomes impregnated into the structure of the cable core. The filler material 12 may be a self-curing filler, such as depolymerized rubber (DPR) or the like. The central cable core is then wrapped with a Dacron tape layer 15 by a suitable wrapping apparatus 35 in order to facilitate subsequent handling.

Figure 3:
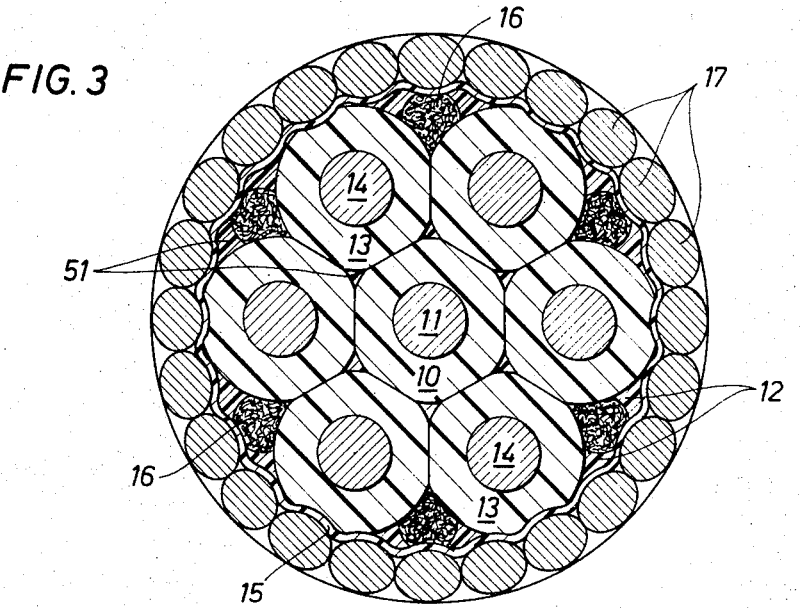
FIG. 3 is an enlarged cross-sectional view showing the construction of the cable of the present invention after the application of the prestressing method of the present invention.

At this point in the manufacturing process, the cable core is completed and is ready to receive the outer layers of armor wire. The cable core passes through a first armor layer wrapping machine 36 which applies the armor wires from supply spools 42. From the machine 36 the cable then passes through a plurality of heated rollers 45 which may be seen more clearly in the detail of FIG. 4A. The heated rollers 45 supply inward radial force on the cable core and simultaneously heat the cable core to the point where the conductor insulators are pliable, but not melted. Preferably, the cable core is heated to a temperature of approximately 250° F. The pressure supplied by heated rollers 45 causes the conductor insulators to become deformed so as to fill any interstices present in the cable core as illustrated in FIG. 3. As previously discussed, this accomplishes pre-stressing of the cable provided the plastic memory of the conductor insulators is altered so that they will retain their deformed shape.

The alteration of the plastic memory of the conductor insulators is accomplished by passing the cable further through a second set of rollers 46 which are cooling rollers. The cooling rollers 46 are designed to bring the temperature of the interior cable core back to approximately 70° F., and are of similar construction to the heating rollers 45 which may be seen in more detail in FIG. 4A. The cooling rollers 46 maintain the cable core in its deformed state while the cable is cooled, thus altering the plastic memory of the conductor insulation materials and completing the prestressing process.

Upon completion of the prestressing process the cable passes through a second armor wire wrapping machine 38 which wraps the second armor layer 18 about the now finished cable to complete the manufacturing process. The cable is then taken up on a storage reel 39.

Figure 5:
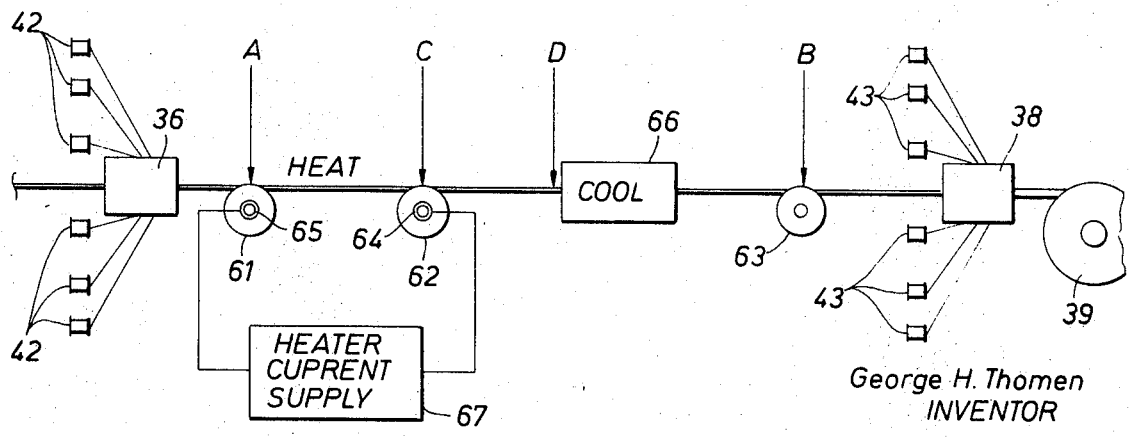
FIG. 5 is a schematic diagram of another embodiment of the present invention showing a portion of a production line for producing the cable.

FIG. 5 is a schematic representation of a portion of an alternate cable production line for making cable in accordance with the present invention, but showing only that portion of the construction line involving the prestressing steps. It will be appreciated that the portion of FIG. 5 deleted to the left would be the same as that to the left of the first armor wrapping machine 36 in FIG. 4. The completed central cable core enters the armor wrapping machine 36 which applies the first armor layer 17 thereto, the armor wires being supplied from supply spools 42. The partially finished cable then enters a system of powered or motor driven capstans 61, 62 and 63 where tension is applied to the cable. The cable is passed several turns about each of the capstans 61, 62 and 63, and thereby frictionally engages the capstans. The capstans 61 and 62 may be equipped, for example, with friction drag brakes 64 and 65. Motor driven capstan 63 may be driven at a faster rate than capstans 61 and 62. This, coupled with the action of friction drag brakes 64 and 65, acts to supply tension to the section of the cable between the points A and B on the production line. A heater current supply 67 coupled to the capstans 61 and 62 by commutators (not shown) passes an electrical current through the outer armor layer for heating the interior cable core to the point where the inner conductor insulators become pliable, but not melted. As previously discussed, this temperature can be, for example, approximately 250° F. The tension supplied in the cable by the action of capstans 61, 62 and 63 causes the outer cable armor to tend to unwind and to exert an inward radial force on the cable core. This deforms the inner conductor insulators as illustrated in FIG. 3 into a hexagonal or other irregular shape to fill the remaining interior interstices within the cable. Before the tension is relieved, the plastic memory of the conductor insulators is altered by passing the cable through a cooling trough 66 while still under tension between points D and B. Cooling trough 66 which may be filled with a suitable coolant such as water or the like, is sufficiently long to insure the cooling of the cable to a temperature of approximately 70° F. The cooling of the conductor insulators while they are in their deformed state alters the plastic memory of the conductor insulators. That is to say, the conductor insulators will tend to retain their deformed state when tension is relieved from the cable as it exits the prestressing apparatus at point B.

By performing the prestressing step on the cable prior to the installation of the final armor layer, the step may be carried out while applying less tension to the cable than if the prestressing were performed after the cable were finished. On the other hand, if the roller apparatus of FIG. 4 were used only an amount of tension required to pass the cable through the line is needed. Further, less electrical current need be used to heat the unfinished cable since the heat does not have to penetrate the additional armor layer to reach the cable interior. The use of less tension and less heating current in prestressing the cable creates a low probability of damaging the cable during the prestressing process.

Finally, after leaving motor driven capstan 63 of FIG. 5 the cable passes through a second armor wrapping machine 38 which wraps the outer armor layer from supply spools 43 onto the cable construction. The outer armor layer is wrapped with an opposite lay and differing pitch in the manner disclosed in U.S. Pat. 3,137,988 in order to provide a torque balanced cable.

Although the apparatus shown can be used in the method of the present invention in an efficient manner, it will be appreciated that under some manufacturing conditions it may be desirable to practice certain steps of the method in a slightly different manner. For example, in the embodiment shown in FIG. 4, rather than using heated rollers, the cable could be passed through a heating oven or the like prior to entering the rollers, or the rollers themselves could be contained in a heating oven. Similarly, in the embodiment shown in FIG. 5 a heating oven could be used rather than passing a heating current through the cable armor. Although not specifically shown in the drawings, the heating and cooling systems may contain servo or feedback control system to accurately control the cable temperature and tension. Similarly, the output rate of the entire system could be servo controlled to give a constant output speed.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. A method for manufacturing armored well logging cable having a core containing conductors insulated with thermoplastic materials, comprising the steps of:

passing the cable core along a production line;
   applying a first layer of armor wire over said cable core;

heating said cable core to a degree sufficient to cause the thermoplastic insulation materials to be pliable but not melted;

applying inward radial forces to deform said insulation materials to fill any interstices in said core;

cooling said core while continuing to apply said inward radial forces to maintain the deformed state of said insulation materials, thereby altering the shape memory of said insulation materials; and applying a second layer of armor wire over said first armor wire layer.

2. The method of claim 1 wherein said heating and applying steps are performed simultaneously.

3. The method of claim 2 wherein the steps of heating said cable core and applying inward radial forces thereto are preformed by passing the cable core having one armored layer between a plurality of heated rollers, said heated rollers functioning to transfer heat to the cable core and to supply inward radial forces sufficient to deform said thermoplastic insulation material to fill any interstices within said core.

4. The method of claim 3 wherein the step of cooling said cable core while continuing to apply inward radial forces thereto is carried out by passing the cable core having one armored layer between a plurality of cooling rollers, said cooling rollers functioning to absorb heat from the cable core and to supply inward radial forces sufficient to maintain the deformation of said thermoplastic insulation materials while the heat is being absorbed from the cable core.

5. The method of claim 2 wherein the steps of heating said cable core and applying inward radial forces thereto are performed by passing the cable having one armored layer between a plurality of powered capstans, said capstans being driven at different rates to supply longitudinal tension in the portion of the cable between said capstans, said longitudinal tension functioning to cause said first armor layer to exert inward radial forces on said cable core to deform said thermoplastic insulation materials to fill any interstices in said core, and by passing an electrical current through the armor of the portion of the cable between at least two of said plurality of capstans to heat the portion of the cable core between the two capstans to a degree sufficient to cause the thermoplastic insulation materials to be pliable but not melted.

6. The method of claim 5 wherein the step of cooling said cable core while continuing to apply inward radial forces thereto is performed by passing said cable through a cooling means disposed subsequent to the means for heating the cable core in said production line but still in the portion of the cable under longitudinal tension, said cooling means functioning to absorb heat from said cable while the longitudinal tension maintains inward radial forces sufficient to continue the deformation of said thermoplastic insulation during cooling to alter the shape memory of said thermoplastic insulation materials.

7. The method of claim 1 wherein the step of heating said cable core to a degree sufficient to cause the thermoplastic insulation materials to be pliable but not melted comprises heating said cable core to approximately 250° F.

References Cited

UNITED STATES PATENTS

| | | | |
|---|---|---|---|
| 2,037,506 | 4/1936 | Ensinger et al. | 57—55.5 |
| 2,218,979 | 10/1940 | Arutunoff | 57—162 |
| 2,940,883 | 6/1960 | Pierce | 57—55.5 XR |
| 3,020,701 | 2/1962 | McCormick | 57—160 |
| 3,137,988 | 6/1964 | Bowers et al. | 57—55.5 |
| 3,425,207 | 2/1969 | Campbell | 57—162 XR |

DONALD E. WATKINS, Primary Examiner

U.S. Cl. X.R.

57—15, 55